(12) United States Patent
Cook

(10) Patent No.: US 6,579,084 B1
(45) Date of Patent: Jun. 17, 2003

(54) MELTBLOWN DIE TIP WITH CAPILLARIES FOR EACH COUNTERBORE

(75) Inventor: Michael C. Cook, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 85 days.

(21) Appl. No.: 09/625,465

(22) Filed: Jul. 25, 2000

(51) Int. Cl.⁷ .............................................. B29C 47/12
(52) U.S. Cl. .................................. 425/463; 425/382 R
(58) Field of Search ......................... 425/72.2, 731.5, 425/378.2, 382 R, 463

(56) References Cited

U.S. PATENT DOCUMENTS

| | | | |
|---|---|---|---|
| 3,825,380 A | | 7/1974 | Harding et al. ............... 425/72 |
| 4,013,816 A | * | 3/1977 | Sabee et al. ................. 264/210 |
| 4,242,075 A | * | 12/1980 | Higuchi et al. ............. 425/462 |
| 4,486,161 A | | 12/1984 | Middleton ..................... 425/7 |
| 4,887,957 A | * | 12/1989 | Ohta et al. .................. 425/463 |
| 4,934,916 A | * | 6/1990 | Lambertus .................... 425/67 |
| 6,120,276 A | * | 9/2000 | Balk ........................... 425/463 |
| 6,164,950 A | * | 12/2000 | Barbier et al. ........... 425/378.2 |

* cited by examiner

Primary Examiner—Robert Davis
Assistant Examiner—Thu Khanh Nguyen
(74) Attorney, Agent, or Firm—Pauley Petersen Kinne & Erickson

(57) ABSTRACT

A extruded filament die tip, such as meltblown filaments, has a plurality of bores communicating with the main polymer distribution channel. The bores have a plurality of capillary openings, or spinnerettes, drilled into the bore to act as extrusion orifices for the die tip. The present die tip differs from conventional die tips in which capillaries are drilled into a deep slot formed in the die tip for polymer distribution. The invention allows more material to remain in the body of the die tip while facilitating more spinnerette openings per linear inch in the die tip and permitting higher operating pressures and smaller diameter fibers such as between 1 and 4 microns. A resultant nonwoven fabric made with the die tip will have a higher hydrohead resistance due to the increased number of fine filaments per inch for the same osy of fabric.

24 Claims, 2 Drawing Sheets

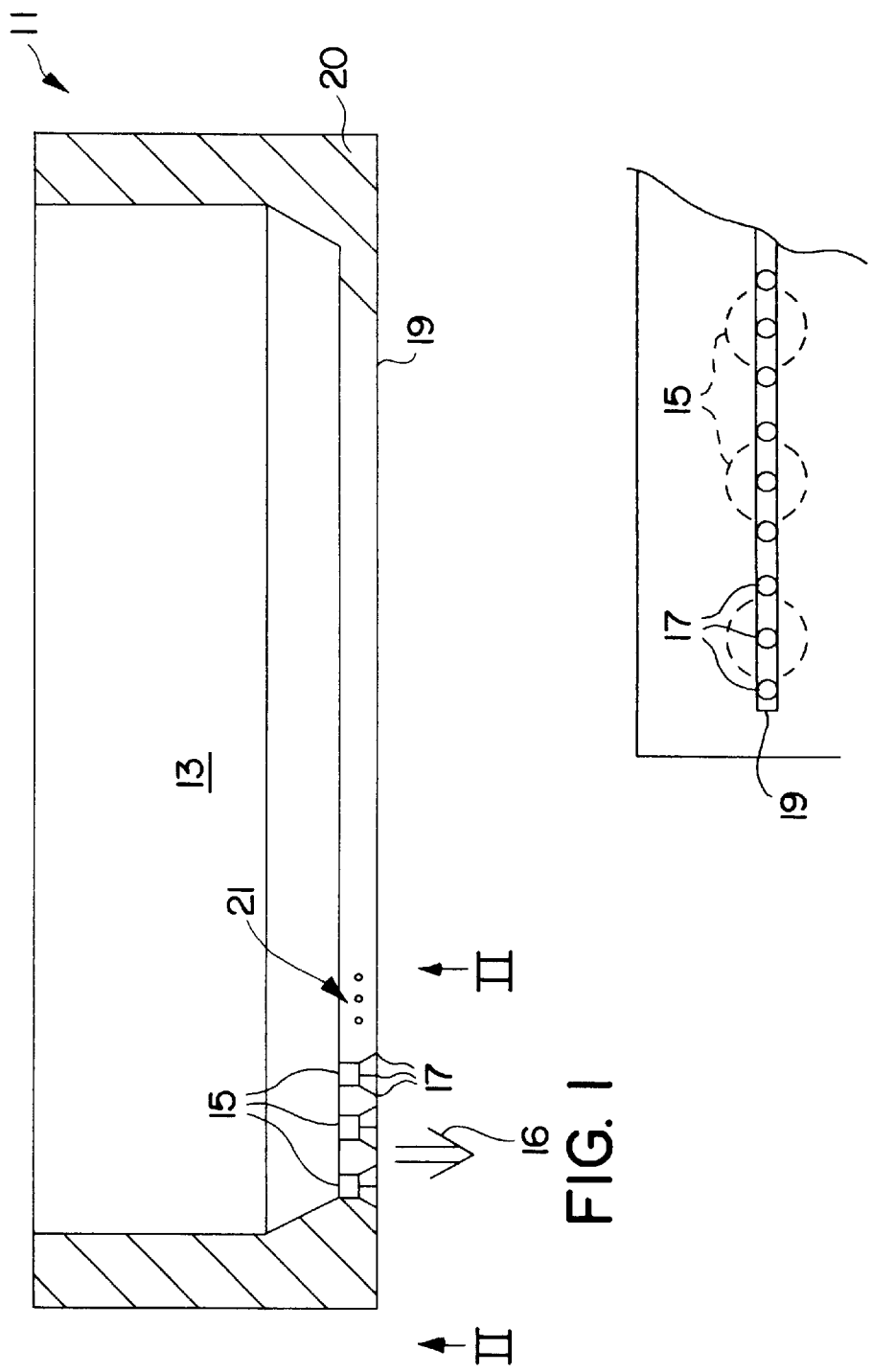

MELTBLOWN DIE TIP WITH CAPILLARIES FOR EACH COUNTERBORE

BACKGROUND OF THE INVENTION

1. Field of the Invention

The present invention relates to die heads for extruded filaments and particularly die heads for extruding meltblown fabrics.

2. Discussion of the Related Art

A general overview of meltblown polymer filament technology may be had by referring to U.S. Pat. No. 3,825,380 (Harding et al.).

Generally a single deep polymer-distribution channel is formed in the die head and multiple capillaries are drilled in the so-called "knife edge", or extrusion edge of the die tip to contact the distribution channel and provide the extrusion channels and orifices for the fine, or small, diameter, meltblown fibers. The reader is also referred to U.S. Pat. No. 4,486,161 (Middleton) and U.S. Pat. No. 4,013,816 (Sabee et al.).

The words "fibers" and "filaments" will be used interchangeably in this specification.

However, owning to physical constraints of the die head, such as the requirement for a fine edge at the point of extrusion, there have always been tradeoffs between extrusion pressure and meltblown die capillary density in the meltblown die head. Ideally the maker of meltblown fabrics would prefer to have options for utilizing both higher pressures and greater capillary density than were previously available from prior art designs.

SUMMARY OF THE PRESENT INVENTION

In order to accomplish the object of higher die head pressures and greater capillary, or extrusion orifice, density in a meltblown fiber die head, the present invention provides a die head with bores communicating with a central polymer distribution channel and running in the extrusion direction to communicate with multiple capillaries. At least some, or all, of the bores will have multiple capillary extrusion outlets. By distributing multiple capillaries to a bore, more metal may be retained in the die head thereby allowing higher pressures in the extrusion process while permitting higher capillary density.

It is anticipated that the die tip of the present invention will withstand extrusion pressures that would cause other seals in the die head assembly to fail, resulting in no practical pressure limit on the die tip of the present invention.

BRIEF DESCRIPTION OF THE DRAWINGS

These and other objects and features of this invention will be better understood from the following detailed description taken in conjunction with the drawings wherein:

FIG. 1 is a front elevation of a meltblown fiber die head according to the present invention.

FIG. 2 is a bottom view, along line II—II of FIG. 1, of a section of the knife edge of the die showing the in-line capillaries with regular spacing and counterbores in phantom.

Figure 3:
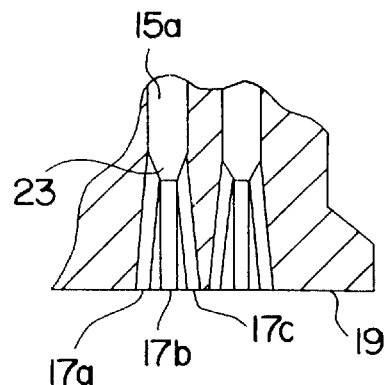
FIG. 3 and FIG. 4 show cross-sectional views of a front elevation to illustrate various densities of the multiple capillaries.

It will be appreciated that the drawings may be highly schematic and not to scale for purposes of clear explanation of the principles of the present invention.

DESCRIPTION OF PREFERRED EMBODIMENTS

Referring to FIG. 1, the die tip 11 is shown with a polymer distribution channel 13 connected to multiple counterbores, collectively 15, whose longitudinal axes are parallel to the extrusion direction 16, and which in turn communicate with the capillaries, collectively 17. The capillaries pass through the die head body 20 and serve as the extrusion orifices of the die head 11 at its knife edge 19. While these counterbores 15 are shown as continuing across the width of the die head, as indicated by the three dots 21, it will be appreciated by the person having ordinary skill in the art that various suitable arrangements of counterbores and capillaries may be arranged according to the dictates of the particular manufacturing situation within the teachings of the present invention.

While designated as being a straight-sided counterbore, the bore need not have parallel sides if machining techniques or design dictates otherwise. Neither must the longitudinal axis of a bore necessarily run parallel to the extrusion direction 18, i.e. perpendicular to the knife edge 19. The ordinary skilled artisan will further appreciate that various common arrangements and components of a working die head have been left unshown or unstated as they are unnecessary to an exposition of the present invention.

Referencing FIG. 2, a partial bottom view of the knife edge 19, the outlets of the capillaries 17 can be seen with the counterbores 15 shown in phantom. While shown as being regular in spacing, alignment, and distribution, the capillaries of the present invention, and their counterbores, need not be so limited to regular forms.

Referencing FIG. 3, a partial cross-section at a front elevational view, there is shown a detailed view of these capillaries 17a, 17b, and 17c communicating between a first counterbore 15a and the knife edge 19 of the die. It will be noted that the capillaries which are off-center of the counterbore, 17a, 17c, will be drilled at slight angles to the longitudinal axis of the counterbore 15a. The counterbore may include a conical countersink portion 23 at its juncture with the capillaries 17.

Figure 4:
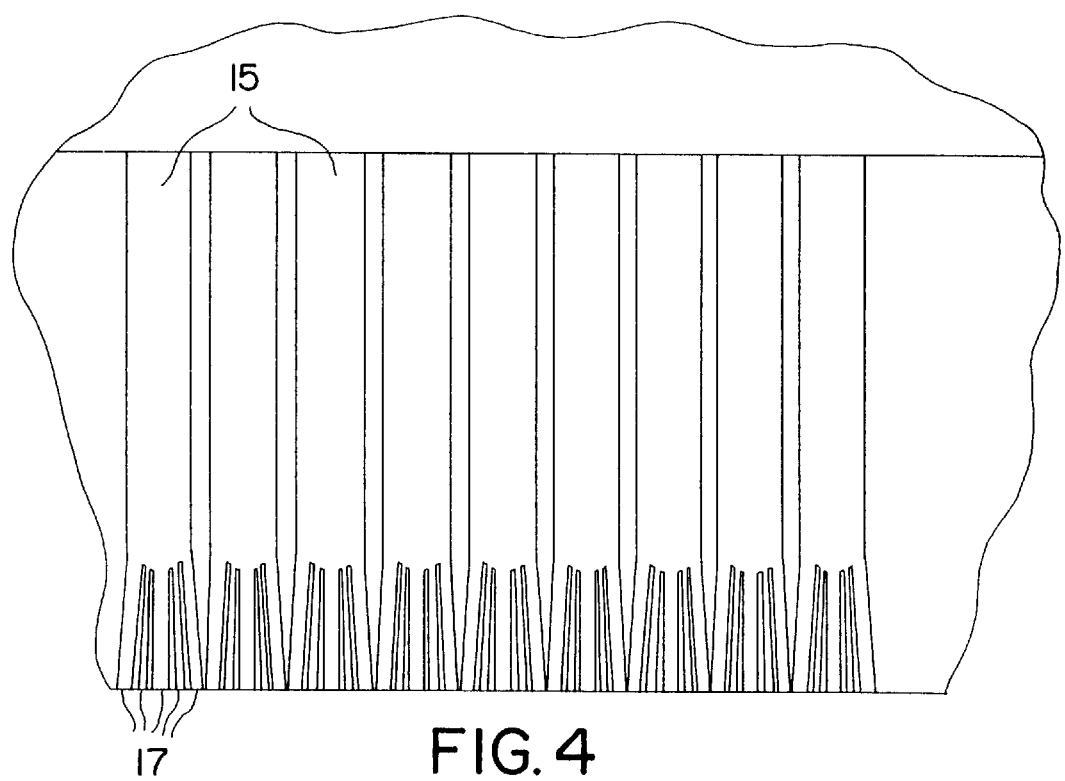

FIG. 4 illustrates that even higher concentrations of capillaries may be achieved. In this case, five capillaries 17 are shown connecting to each counterbore 15. Present conventional drilling can easily achieve one hundred holes per inch in an exemplary die tip by utilizing the present invention.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A extruded filament die tip comprising:
    a plurality of bores formed in the die tip for communicating with a supply of polymer material; and
    each bore of the plurality of bores contacting a plurality of capillaries formed in the die tip at a knife edge thereof with each capillary to act as an extrusion orifice for a single filament.

2. The die tip according to claim 1 wherein each bore of the plurality of bores is a straight counterbore.

3. The die tip according to claim 1 wherein each bore of the plurality of bores includes a cylindrical countersink.

4. The die tip according to claim 1 wherein from three to eight capillaries contact at least one of the plurality of bores.

5. The die tip according to claim 4 wherein at least some capillaries are bored at an angle to the longitudinal axis of the at least one of the plurality of bores.

6. The die tip according to claim 1 wherein some capillaries are angled to the longitudinal axis of each bore.

7. The die tip according to claim 1 wherein all capillaries are centered on the centerline of the edge.

8. The die tip according to claim 1 wherein all capillaries are equally spaced.

9. A extruded filament die tip comprising:

a die tip having an extrusion direction and a polymer distribution channel;

a plurality of bores formed in the die tip with longitudinal axes parallel to the extrusion direction;

the bores communicating between the polymer distribution channel and a plurality of capillaries, with each capillary acting as an extrusion orifice for a single filament;

the capillaries formed in the die tip at a knife edge thereof;

at least one of the bores contacting a plurality of capillaries.

10. The die tip according to claim 9 wherein the at least one bore is a straight counterbore.

11. The die tip according to claim 9 wherein the at least one bore includes a cylindrical countersink.

12. The die tip according to claim 9 wherein from three to eight capillaries contact the at least one bore.

13. The die tip according to claim 12 wherein at least some capillaries are bored at an angle to the longitudinal axis of the at least one bore.

14. The die tip according to claim 9 wherein some capillaries are angled to the longitudinal axis of the at least one bore.

15. The die tip according to claim 9 wherein all capillaries are centered on the centerline of the edge.

16. The die tip according to claim 9 wherein all capillaries are equally spaced.

17. A extruded filament die tip comprising:

a die tip having an extrusion direction;

a plurality of bores formed in the die tip with longitudinal axes extending in the extrusion direction; and a plurality of capillaries formed in the die tip at a knife edge thereof, each bore contacting a plurality of capillaries with each capillary acting as an extrusion orifice for a single filament.

18. The die tip according to claim 17 wherein each bore is a straight counterbore.

19. The die tip according to claim 17 wherein each bore includes a cylindrical countersink.

20. The die tip according to claim 17 wherein from 3–8 capillaries contact each bore.

21. The die tip according to claim 20 wherein at least some capillaries are bored at an angle to the longitudinal axis of each bore.

22. The die tip according to claim 17 wherein some capillaries are angled to the longitudinal axis of each bore.

23. The die tip according to claim 17 wherein all capillaries are centered on the centerline of the edge.

24. The die tip according to claim 17 wherein all capillaries are equally spaced.

* * * * *